(12) United States Patent
Chang

(10) Patent No.: US 9,378,539 B1
(45) Date of Patent: Jun. 28, 2016

(54) IMAGE PROCESSING METHOD AND MOBILE ELECTRONIC DEVICE

(71) Applicant: Wistron Corporation, New Taipei (TW)

(72) Inventor: Yao-Tsung Chang, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 14/690,478

(22) Filed: Apr. 20, 2015

(30) Foreign Application Priority Data

Jan. 6, 2015 (TW) .............................. 104100258 A

(51) Int. Cl.
  *H04N 5/262* (2006.01)
  *G06T 3/40* (2006.01)
  *H04N 5/232* (2006.01)
  *H04N 5/225* (2006.01)

(52) U.S. Cl.
  CPC ............ *G06T 3/4007* (2013.01); *H04N 5/2258* (2013.01); *H04N 5/23212* (2013.01); *H04N 5/23296* (2013.01)

(58) Field of Classification Search
  None
  See application file for complete search history.

(56) References Cited

U.S. PATENT DOCUMENTS

2008/0030592 A1   2/2008   Border et al.
2011/0228120 A1   9/2011   Inoue et al.

*Primary Examiner* — Roberto Velez
*Assistant Examiner* — Stephen Coleman
(74) *Attorney, Agent, or Firm* — Jianq Chyun IP Office

(57) ABSTRACT

Provided is an image processing method adapted for a mobile electronic device. The image processing method includes the steps of: deriving an original image; and executing a calculating procedure according to the original image to derive an up-sample image. The calculating procedure includes the steps of: making the up-sample image to be overlapped with the original image; deriving pixels of the original image overlapped with an $n^{th}$ pixel of the up-sample image and pixel values of the pixels; deriving a proportion between each of the pixels of the original image (that overlapped with the $n^{th}$ pixel of the up-sample image) and the $n^{th}$ pixel, and setting the proportion as a weight; and calculating a pixel value of the $n^{th}$ pixel of the up-sample image according to the pixel values of the pixels of the original image overlapped with the $n^{th}$ pixel of the up-sampling image and the corresponding weight.

13 Claims, 4 Drawing Sheets

IMAGE PROCESSING METHOD AND MOBILE ELECTRONIC DEVICE

CROSS-REFERENCE TO RELATED APPLICATION

This application claims the priority benefit of Taiwan application serial no. 104100258, filed on Jan. 6, 2015. The entirety of the above-mentioned patent application is hereby incorporated by reference herein and made a part of this specification.

BACKGROUND OF THE INVENTION

1. Field of the Invention

The invention relates to an image processing method and a mobile electronic device.

2. Description of Related Art

With continuous development of technologies, people's reliance on mobile electronic devices such as smart phones, tablet computers or digital cameras are gradually deepened. Capturing images by utilizing a camera module in aforesaid mobile electronic devices has also become an indispensable part in daily lives of people With increases in usages of the camera module, people's demand on higher image quality are increased accordingly. A size of the image (corresponding to an amount of pixels) and the image quality plays an important role in presenting a viewing experience for users.

SUMMARY

The invention is directed to an image processing method and a mobile electronic device, which are capable of generating an up-sample image with preferable image quality in a simple manner.

An image processing method of the invention is adapted for a mobile electronic device, and includes steps of deriving an original image, where the original image includes a plurality of pixels. Further, a calculating procedure is executed according to the original image to derive an up-sample image. The calculating procedure includes the following steps. The up-sample image is made to be overlapped with the original image. At least one of the pixels of the original image overlapped with an $n^{th}$ pixel of the up-sample image and a pixel value of the at least one of the pixel are derived. Herein, a value of n ranges between 1 and N, and N is corresponding to a pixel amount of the up-sample image. A proportion between the at least one of the pixels of the original image overlapped with the $n^{th}$ pixel of the up-sample image and the $n^{th}$ pixel is derived, and the proportion is set as a weight. Further, a pixel value of the $n^{th}$ pixel of the up-sample image is calculated according to the pixel value of the at least one of the pixels of the original image overlapped with the $n^{th}$ pixel of the up-sample image and the corresponding weight.

A mobile electronic device is also provided, which includes a first camera module and a processing unit. The first camera module derives an original image, and the original image includes a plurality of pixels. The processing unit is coupled to the first camera module, and executes a calculating procedure according to the original image to derive a pixel value of each of pixels of an up-sample image of the original image. The calculating procedure includes steps of: making the up-sample image to be overlapped with the original image; deriving at least one of the pixels of the original image overlapped with an $n^{th}$ pixel of the up-sample image and a pixel value of the at least one of the pixels, where a value of n ranges between 1 and N, and N is corresponding to a pixel amount of the up-sample image; deriving a proportion between the at least one of the pixels of the original image overlapped with the $n^{th}$ pixel of the up-sample image and the $n^{th}$ pixel, and setting the proportion as a weight; and calculating a pixel value of the $n^{th}$ pixel of the up-sample image according to the pixel value of the at least one of the pixels of the original image overlapped with the $n^{th}$ pixel of the up-sample image and the corresponding weight.

Based one the above, the image processing method and the mobile electronic device provided by the invention are capable of generating the up-sample image in a simple manner while maintaining the image quality.

To make the above features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION

Figure 1:
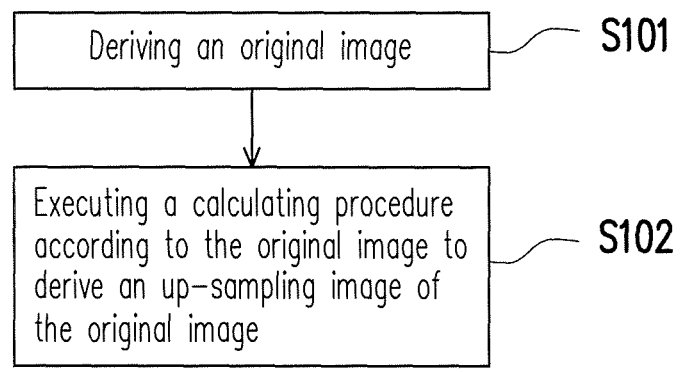
FIG. 1 is a flowchart illustrating an image processing method according an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a flowchart illustrating an image processing method according an embodiment of the invention. Herein, the image processing method is adapted for a mobile electronic device such as a smart phone, a tablet computer or a digital camera. Referring to FIG. 1, first, in step S101, an original image is derived, and the original image includes a plurality of pixels. Then, in step S102, a calculating procedure is executed according to the original image to derive an up-sample image of the original image. Among them, the calculating procedure includes the following steps. First, the up-sample image is made to be overlapped with the original image. Then, at least one of the pixels of the original image overlapped with an $n^{th}$ pixel of the up-sample image and a pixel value of the at least one of the pixel are derived. Herein, a value of n ranges between 1 and N, and N is corresponding to a pixel amount of the up-sample image. Subsequently, a proportion between the at least one of the pixels of the original image overlapped with the $n^{th}$ pixel of the up-sample image and the $n^{th}$ pixel is derived, and the proportion is set as a weight. Further, a pixel value of the $n^{th}$ pixel of the up-sample image is calculated according to the pixel value of the at least one of the pixels of the original image overlapped with the $n^{th}$ pixel of the up-sample image and the corresponding weight. Herein, the pixel is a basic unit for representing an image content of an image. In the invention, the pixels of the original image and the up-sample image could be represented in forms of a gray level value, RGB or YUV.

Figure 2:
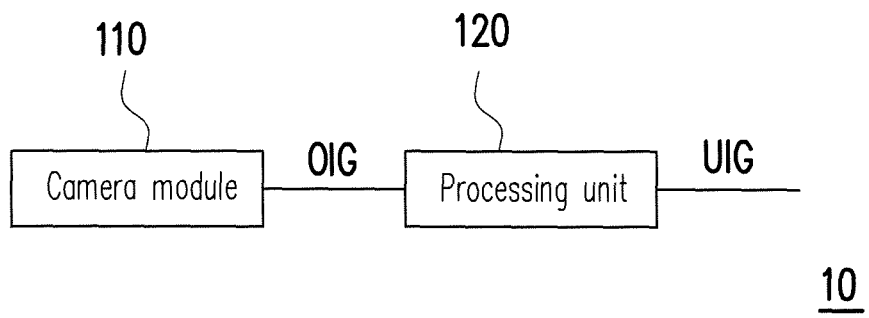
FIG. 2 is a functional block diagram illustrating a mobile electronic device according to an embodiment of the invention.

FIG. 2 is a functional block diagram illustrating a mobile electronic device according to an embodiment of the invention. Referring to FIG. 2, a mobile electronic device 10 includes a camera module 110 and a processing unit 120. The camera module 110 derives an original image OIG, and the original image includes a plurality of pixels. The processing unit 120 is coupled to the camera module 110 to generate an up-sample image UIG of the original image OIG and executes a calculating procedure according to the original image OIG to derive a pixel value of each of pixels of the up-sample image UIG. The calculating procedure includes the following steps. First, the up-sample image is made to be overlapped with the original image. Then, at least one of the pixels of the original image overlapped with an $n^{th}$ pixel of the up-sample image and a pixel value of the at least one of the pixel are derived. Herein, a value of n ranges between 1 and N, and N is corresponding to a pixel amount of the up-sample image. Subsequently, a proportion between the at least one of the pixels of the original image overlapped with the $n^{th}$ pixel of the up-sample image and the $n^{th}$ pixel is derived, and the proportion is set as a weight. Further, a pixel value of the $n^{th}$ pixel of the up-sample image is calculated according to the pixel value of the at least one of the pixels of the original image overlapped with the $n^{th}$ pixel of the up-sample image and the corresponding weight.

In brief, the up-sample image UIG presents the same image content of the original image OIG with a higher pixel density (i.e., with more pixels). Therefore, in aforesaid calculating procedure, the processing unit 120 makes the up-sample image UIG to be overlapped with the original image OIG to find a relationship of each of the new and old pixels (the pixels of the up-sample image UIG and the corresponding pixels of the original image OIG), and then calculates a pixel value of each of the pixels of the up-sample image UIG according to aforesaid relationship. The higher pixel density means that, in the up-sample image UIG, more of the pixels are used to present the same image content of the original image OIG. For example, the image content represented by one pixel in the original image OIG is represented by two or four pixels in the up-sample image UIG instead, and a proportion relationship thereof changes based on a sampling rate of the up-sample image. In the present embodiment, for the convenience of explanation, a size of area occupied by each of the pixels of the up-sample image UIG is identical to a size of area occupied by each of the pixels of the original image OIG. Accordingly, a size of the up-sample image UIG is greater than a size of the original image OIG. In order to make the up-sample image UIG and the original image OIG (which are images with different sizes) to be overlapped, the processing unit 120 must first scale down the up-sample image UIG.

For example, in the case where a length of the up-sample image UIG is i times a length of the original image OIG (i.e., in a length direction, the sampling rate of the up-sample image UIG is i times the sampling rate of the original image OIG) and a width of the up-sample image UIG is j times a width of the original image (i.e., in a width direction, the sampling rate of the up-sample image UIG is j times the sampling rate of the original image OIG), the processing unit 120 reduces the up-sample image UIG by dividing the length of the up-sample image UIG by i and dividing the width of the up-sample image UIG by j in order to derive a reduced image, such that a size of the reduced image is identical to the size of the original image OIG. Subsequently, the processing unit 120 makes the reduced image to be overlapped on the original image OIG. Accordingly, the processing unit 120 may quickly derive the relationship of each of the pixels in the up-sample image UIG and the corresponding pixel in the original image OIG.

Figure 3A:
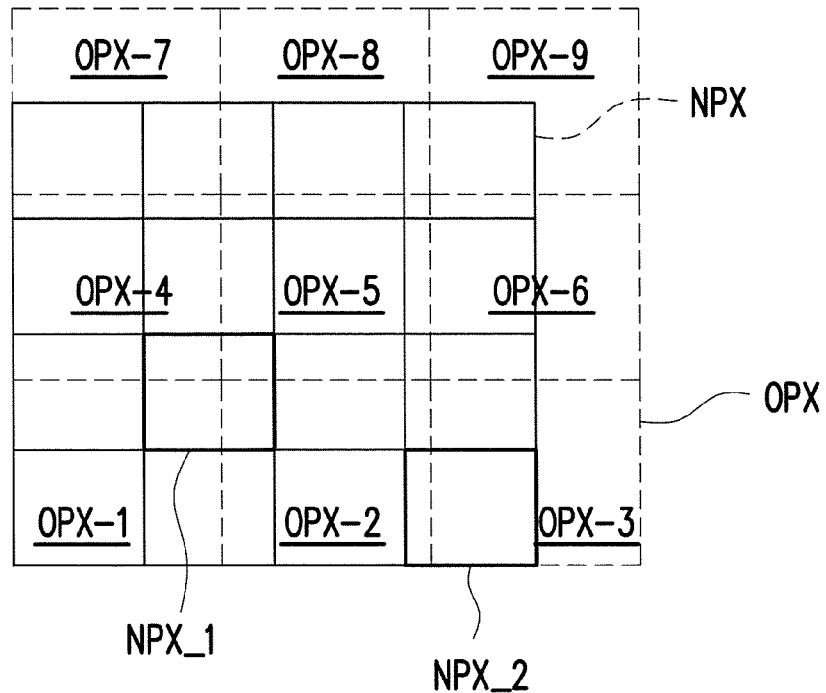
FIG. 3A to FIG. 3C are schematic diagrams illustrating relationships of the pixels of the up-sample image and the pixels of the original image.
Figures 3B, 3C:
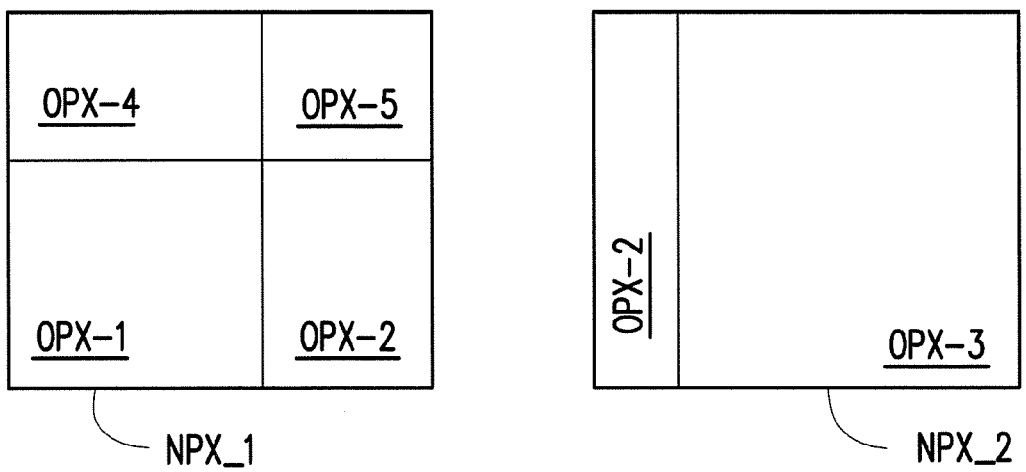

FIG. 3A to FIG. 3C are schematic diagrams illustrating relationships of the pixels of the up-sample image and the pixels of the original image. Referring to FIG. 3, as in comparison with the original image OIG, a resolution of the up-sample image UIG is increased. In the present embodiment, based on the concept where each of the pixels of the up-sample image UIG and the original image OIG have the same size, both the length and the width of the up-sample image UIG are enlarged by 1.6 times as compared to the original image OIG. Therefore, during aforesaid calculating procedure, the processing unit 120 considers that each of the pixels of the up-sample image UIG is reduced by 1.6 times, such that the proportion relationship of pixels OPX of the original image OIG (herein, only pixels OPX-1 to OPX-9 are illustrated, for example) and pixels NPX (herein, only those correspondingly related to the pixels OPX-1 to OPX-9 of the original image are illustrated, for example) of the up-sample image UIG are as shown by FIG. 3A.

In the present embodiment, the processing unit derives a proportion between the at least one of the pixels of the original image overlapped with the $n^{th}$ pixel of the up-sample image UIG and the $n^{th}$ pixel, and sets the proportion as a weight, so as to calculate the pixel value of the $n^{th}$ pixel. In other words, the pixel value of each pixel of the up-sample image UIG is a sum of products of the pixels overlapped with the original image multiplied by the corresponding proportion.

Hereinafter, the pixel NPX_1 of the up-sample image UIG is taken as an example. FIG. 3B is a schematic diagram illustrating a relationship of the pixels of the up-sample image and the pixels of the original image, and what illustrated in FIG. 3B is an enlarged schematic diagram of the pixel NPX_1 of the up-sample image UIG. Referring to FIG. 3B, the pixel NPX_1 of the up-sample image UIG is corresponding to the pixels OPX-1, OPX-2, OPX-4 and OPX-5 of the original image OIG. Herein, proportions of the pixels OPX-1, OPX-2, OPX-4 and OPX-5 of the original image OIG with respect to the pixel NPX_1 of the up-sample image UIG are approximately 4/9, 2/9, 2/9 and 1/9, respectively. These proportions may be set as the weights, such that the pixel value of the pixel NPX_1 of the up-sample image UIG is equal to:

$$NPX\_1 = \frac{4}{9}(OPX\_1) + \frac{2}{9}(OPX\_2) + \frac{2}{9}(OPX\_4) + \frac{1}{9}(OPX\_5) \quad (1)$$

Herein, the reference indication (i.e., NPX_1, OPX-1, OPX-2, OPX-4 and OPX-5) of formula (1) indicates the pixel value of each pixel (e.g., NPX_1 is the pixel value of the pixel NPX_1 of the up-sample image UIG).

Similarly, FIG. 3C is a schematic diagram illustrating a relationship of the pixels of the up-sample image and the pixels of the original image, and what illustrated in FIG. 3C is an enlarged schematic diagram of the pixel NPX_2 of the up-sample image UIG in FIG. 3A. In FIG. 3C, the correspondence relationship of the pixel NPX_2 of the up-sample image UIG and the pixel of the original image OIG is relatively simpler. Referring to FIG. 3C, the pixel NPX_2 of the up-sample image UIG is corresponding to the pixels OPX-2 and OPX-3 of the original image OIG, and the proportions thereof are approximately 1/5 and 4/5, respectively. Therefore, the pixel value of the pixel NPX_2 of the up-sample image UIG is equal to:

$$NPX\_2 = \frac{1}{5}(OPX\_2) + \frac{4}{5}(OPX\_3) \qquad (2)$$

The above is merely an example according to an embodiment of the invention, and the processing unit 120 may adjust the proportion for each the weights and the calculation for each pixel in the calculating procedure based on actual situation, which are not particularly limited in the invention.

In order to simplify aforesaid calculation and derive the image content with higher quality, in an embodiment of the invention, the processing unit 110 further derives a zoom-in image (e.g., which is derived by zooming in a focal distance of the camera module 110 or a camera module disposed on the mobile electronic device 10) to be merged into aforesaid up-sample image UIG in correspondence to the image content. For example, a positioning point may be set (e.g., at a center of the image), so that the positioning point may be registered for merging. Accordingly, the calculation may be simplified since only the pixel values of the corresponding pixels of the up-sample image UIG outside of the zoom-in image are to be derived from aforesaid calculating procedure. Furthermore, aforesaid zoom-in image is an image content practically derived by the camera module (the camera module 110 or other camera modules), and such image content should provide a more preferable image quality than that of the each pixels of the up-sample image UIG which are calculated by using the calculating procedure. Moreover, in the present embodiment, the zoom-in image is corresponding to a center portion of the up-sample image UIG which overlapped with a region of interest (ROI) of general users, such that the image quality at the center of the up-sample image UIG generated by merging the zoom-in image may be relatively better. Accordingly, a viewing experience of the users may also be improved.

Figure 4A:
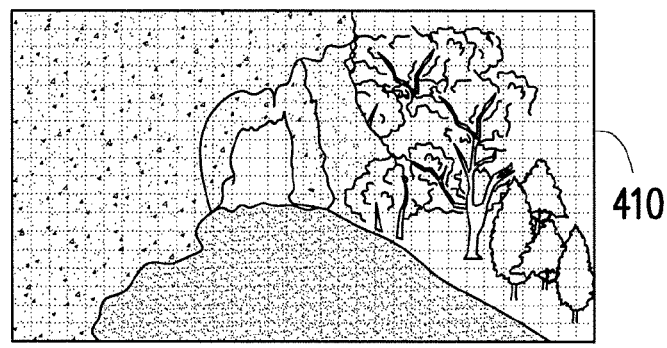
FIG. 4A is a schematic diagram illustrating the original image according to an embodiment of the invention.
Figure 4B:
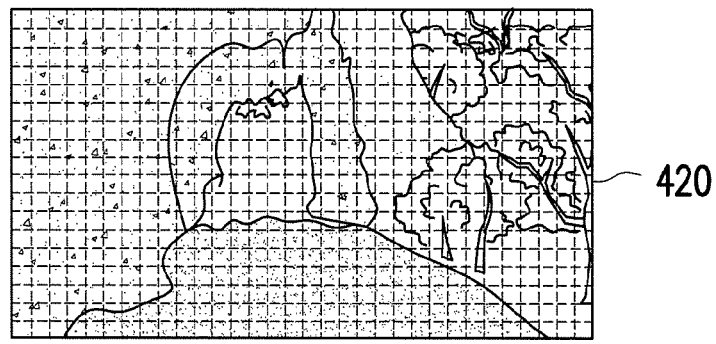
FIG. 4B is a schematic diagram illustrating the zoom-in image according to an embodiment of the invention.
Figure 4C:
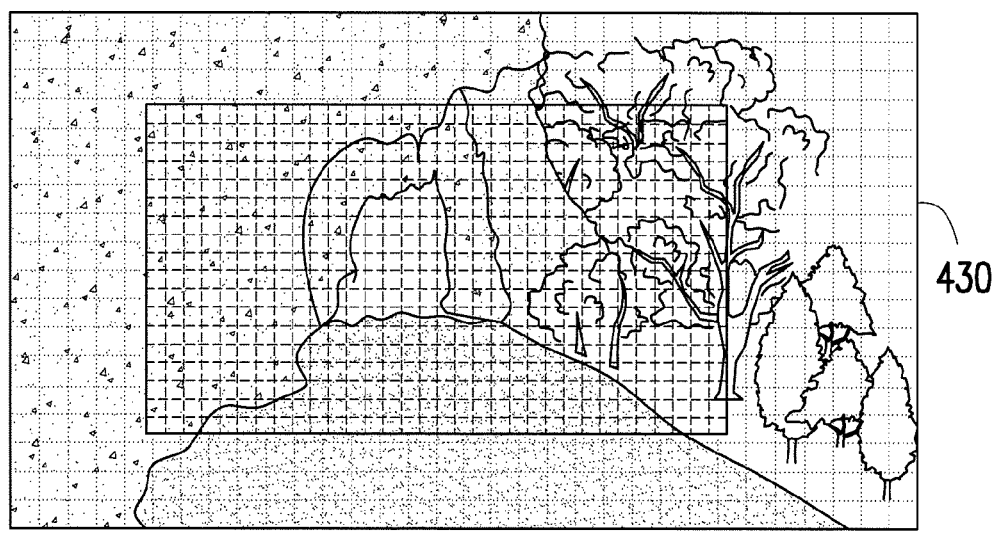
FIG. 4C is a schematic diagram illustrating the up-sample image generated by merging the zoom-in image according to an embodiment of the invention.

For example, FIG. 4A is a schematic diagram illustrating the original image according to an embodiment of the invention. Referring to FIG. 4A, an original image 410 includes an image of a cave and a surrounding view. FIG. 4B is a schematic diagram illustrating the zoom-in image according to an embodiment of the invention. Herein, a zoom-in image 420 is an image derived by the processing unit 120 which uses a camera module of the mobile electronic device 10 to zoom in the focal distance thereof, and such image includes a close-shot of the cave. FIG. 4C is a schematic diagram illustrating the up-sample image generated by merging the zoom-in image according to an embodiment of the invention. In an up-sample image 430 illustrated in FIG. 4C, the cave at the center and the surrounding view are directly represented by the zoom-in image 420, whereas pixel values of pixels of the rest of the up-sample image 430 are derived from the calculation in the aforesaid calculating procedure (e.g., calculation with equations (1) and (2)).

It should be noted that, in order to directly merge the zoom-in image (e.g., the zoom-in image 420 depicted in FIG. 4B) into the up-sample image (e.g., the up-sample image 430 depicted in FIG. 4C), with respect to the same image content, the zoom-in image and the up-sample image should include the same pixel density. In other words, after determining a size of the up-sample image, the processing unit 120 may further zoom in the focal distance of the camera module according to the size of the up-sample image to derive the zoom-in image. Alternatively, after deriving the zoom-in image, the processing unit 120 may derive the size of the up-sample image according to the pixel density of the zoom-in image, and further derive the up-sample image after calculating each pixel value of the up-sample image outside of the zoom-in image, but the invention is not limited there to the above.

In addition, the zoom-in image may be an image derived with an optical zooming manner or a digital zooming manner, but the invention is not limited to the above. Further, considering relationships of a focusing point and a depth of field with respect to the image content, in the present embodiment, it is more preferable that a focusing area of the original image, the zoom-in image and the up-sample image is set to be within a range corresponding to the image content of the zoom-in image. Accordingly, the up-sample image generated by merging the zoom-in image will not show obvious difference in the image, but the invention is not limited to the above setting.

In an embodiment of the invention, the zoom-in image may be derived by the processing unit 120 which captures the image through the camera module 110. That is to say, after deriving the original image OIG, the camera module 110 is then controlled to zoom in the focal distance of the camera module (e.g., according to the size of the up-sample image) in order to derive the zoom-in image. Alternatively, in another embodiment of the invention, the mobile electronic device is disposed with two camera modules. In this case, the processing unit 120 may simultaneously derive the original image OIG and the zoom-in image by the two camera modules, respectively.

Figure 5:
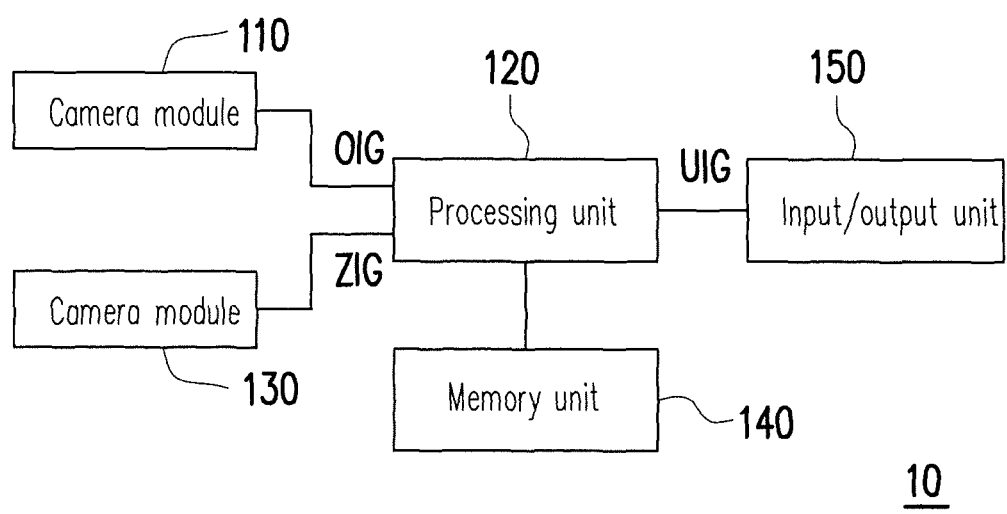
FIG. 5 is a functional block diagram illustrating a mobile electronic device according to an embodiment of the invention.

FIG. 5 is a functional block diagram illustrating a mobile electronic device according to an embodiment of the invention. Herein, unlike the mobile electronic device 10 depicted in the embodiment of FIG. 1, in the embodiment depicted in FIG. 5, besides the camera module 110, the mobile electronic device 10 further includes another camera module 130, and a memory unit 140 and an input/output unit 150 which are coupled to the processing unit 120. Referring to FIG. 5, in the present embodiment, the processing unit 120 derives the original image OIG and a zoom-in image ZIG by the camera modules 110 and 130, respectively. The processing unit 120 generates the up-sample image UIG according to the original image OIG and the zoom-in image ZIG (e.g., by merging the zoom-in image ZIG, and calculating the remaining portions of the up-sample image UIG according to the original image OIG). The memory unit 140 may be configured to temporarily store the original image OIG, the zoom-in image ZIG, the up-sample image UIG or intermediate parameters and information required during the calculation. The input/output unit 150 may receive aforesaid up-sample image UIG from the processing unit 120 and output said up-sample image UIG to, for example, the Internet or a display unit (not illustrated) of the mobile electronic device for viewing.

The mobile electronic device 10 in the embodiment depicted in FIG. 5 disposed with the two camera modules (the camera modules 110 and 130) may be originally designed to capture parallax images. After adopting the method disclosed in the foregoing embodiment, the camera modules 110 and 130 may provide new usages, so there is a new meaning why the two camera modules are to be disposed.

In summary, the invention provides an image processing method and a mobile electronic device, so that the mobile electronic device may derive the image with more pixels by simple calculation and simple capturing method. As for the method in which the up-sample image is generated by merging the zoom-in image, the image quality of the region of interest of the users may be ensured by merging the zoom-in image, so that the viewing experience of the users may also be improved accordingly.

Although the present disclosure has been described with reference to the above embodiments, it will be apparent to one of ordinary skill in the art that modifications to the described embodiments may be made without departing from the spirit of the disclosure. Accordingly, the scope of the disclosure will be defined by the attached claims and not by the above detailed descriptions.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An image processing method, adapted for a mobile electronic device, comprising:
   deriving an original image, wherein the original image comprises a plurality of pixels; and
   executing a calculating procedure according to the original image to derive an up-sample image of the original image, and the calculating procedure comprising:
      making the up-sample image to be overlapped with the original image;
      deriving at least one of the pixels of the original image overlapped with an $n^{th}$ pixel of the up-sample image and a pixel value of the at least one of the pixels, wherein a value of n ranges between 1 and N, and N corresponds to a pixel amount of the up-sample image;
      deriving a proportion between the at least one of the pixels of the original image overlapped with the $n^{th}$ pixel of the up-sample image and the $n^{th}$ pixel, and setting the proportion as a weight; and
      calculating a pixel value of the nth pixel of the up-sample image according to the pixel value of the at least one of the pixels of the original image overlapped with the nth pixel of the up-sample image and the corresponding weight.

2. The image processing method according to claim 1, wherein a size of each of the pixels of the up-sample image is identical to a size of each of the pixels of the original image, a length of the up-sample image is i times a length of the original image, a width of the up-sample image is j times a width of the original image, and the step of making the up-sample image to be overlapped with the original image comprises:
   reducing the up-sample image by dividing the length thereof by i and dividing the width thereof by j in order to derive a reduced image, wherein a size of the reduced image is identical to a size of the original image; and
   making the reduced image to be overlapped with the original image.

3. The image processing method according to claim 1, wherein before executing the calculating procedure according to the original image to derive the up-sample image of the original image, the image processing method further comprises:
   deriving a zoom-in image, wherein the zoom-in image is corresponding to a portion of the original image, and the zoom-in image has a pixel density identical to a pixel density of the up-sample image; and
   the step of executing the calculating procedure according to the original image to derive the up-sample image of the original image comprises:
      merging the zoom-in image into the up-sample image according to the portion of the original image corresponding to the zoom-in image; and
      executing the calculating procedure according to the original image to derive the pixel values of the corresponding pixels of the up-sample image outside of the zoom-in image.

4. The image processing method according to claim 3, wherein before the step of deriving the zoom-in image, the image processing method comprises:
   determining a size of the up-sample image; and
   zooming in a focal distance of a camera module of the mobile electronic device according to the size of the up-sample image to derive the zoom-in image.

5. The image processing method according to claim 3, wherein before the step of deriving the zoom-in image, the image processing method comprises:
   zooming in a focal distance of a camera module of the mobile electronic device to derive the zoom-in image; and
   determining a size of the up-sample image according to the zoomed-in focal distance of the camera module.

6. The image processing method according to claim 3, wherein
   the portion of the original image corresponding to the zoom-in image is located at a center of the original image; and
   a focusing area of the original image is located within the portion of the original image corresponding to the zoom-in image.

7. A mobile electronic device, comprising:
   a first camera module, deriving an original image, wherein the original image comprises a plurality of pixels; and
   a processing unit, coupled to the first camera module, executing a calculating procedure according to the original image to derive an up-sample image of the original image, and the calculating procedure comprising:
      making the up-sample image to be overlapped with the original image;
      deriving at least one of the pixels of the original image overlapped with an $n^{th}$ pixel of the up-sample image and a pixel value of the at least one of the pixels, wherein a value of n ranges between 1 and N, and N is corresponding to a pixel amount of the up-sample image;
      deriving a proportion between the at least one of the pixels of the original image overlapped with the $n^{th}$ pixel of the up-sample image and the $n^{th}$ pixel, and setting the proportion as a weight; and
      calculating a pixel value of the $n^{th}$ pixel of the up-sample image according to the pixel value of the at least one of the pixels of the original image overlapped with the $n^{th}$ pixel of the up-sample image and the corresponding weight.

8. The mobile electronic device of claim 7, wherein
   a size of each of the pixels of the up-sample image is identical to a size of each of the pixels of the original image;
   a length of the up-sample image is i times a length of the original image, a width of the up-sample image is j times a width of the original image;

when making the up-sample image to be overlapped with the original image, the processing unit reduces the up-sample image by dividing the length thereof by i and dividing the width thereof by j in order to derive a reduced image, wherein a size of the reduced image is identical to a size of the original image, and the reduced image is made to be overlapped with the original image by the processing unit.

9. The mobile electronic device according to claim 7, wherein the mobile electronic device further comprises:

a second camera module, coupled to the processing unit, wherein the processing unit controls the second camera module to derive a zoom-in image, wherein the zoom-in image is corresponding to a portion of the original image, and the zoom-in image has a pixel density identical to a pixel density of the up-sample image;

the processing unit merges the zoom-in image into the up-sample image according to the portion of the original image corresponding to the zoom-in image; and the processing unit executes the calculating procedure according to the original image to derive the pixel values of the corresponding pixels of the up-sample image outside of the zoom-in image.

10. The mobile electronic device of claim 7, wherein the processing unit controls the first camera module to derive a zoom-in image, wherein the zoom-in image is corresponding to a portion of the original image, and the zoom-in image has a pixel density identical to a pixel density of the up-sample image;

the processing unit merges the zoom-in image into the up-sample image according to the portion of the original image corresponding to the zoom-in image; and the processing unit executes the calculating procedure according to the original image to derive the pixel values of the corresponding pixels of the up-sample image outside of the zoom-in image.

11. The mobile electronic device of claim 10, wherein the processing unit determines a size of the up-sample image, and zooms in a focal distance of the first camera module according to the size of the up-sample image to derive the zoom-in image.

12. The mobile electronic device of claim 10, wherein the processing unit zooms in a focal distance of the first camera module to derive the zoom-in image, and determines a size of the up-sample image according to the zoomed-in focal distance of the first camera module.

13. The mobile electronic device of claim 10, wherein the processing unit controls the first camera module, so that a focusing area of the original image is located within a portion of the original image corresponding to the zoom-in image; and the processing unit controls the first camera module, so that the portion of the original image corresponding to the zoom-in image is located at a center of the original image.

* * * * *